(12) United States Patent
Lee (10) Patent No.: US 9,899,699 B2
(45) Date of Patent: Feb. 20, 2018

(54) RECHARGEABLE BATTERY HAVING ALTERNATELY STACKED ELECTRODES

(71) Applicant: SAMSUNG SDI CO., LTD., Yongin-si, Gyeonggi-do (KR)

(72) Inventor: Hyoung-No Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 578 days.

(21) Appl. No.: 14/521,027

(22) Filed: Oct. 22, 2014

(65) Prior Publication Data
US 2015/0044555 A1    Feb. 12, 2015

Related U.S. Application Data

(62) Division of application No. 12/805,521, filed on Aug. 4, 2010, now Pat. No. 8,870,977.

(30) Foreign Application Priority Data

Nov. 3, 2009    (KR) .................. 10-2009-0105575

(51) Int. Cl.
*H01M 2/16* (2006.01)
*H01M 10/04* (2006.01)
(Continued)

(52) U.S. Cl.
CPC ........... *H01M 10/045* (2013.01); *H01M 2/16* (2013.01); *H01M 10/0436* (2013.01);
(Continued)

(58) Field of Classification Search
CPC .. H01M 2/16; H01M 10/0436; H01M 10/125; H01M 16/006; H01M 10/045
(Continued)

(56) References Cited

U.S. PATENT DOCUMENTS 6,423,449 B1    7/2002  Hong
6,679,926 B1    1/2004  Kajiura et al.
(Continued)

FOREIGN PATENT DOCUMENTS

CN    201038195 Y    3/2008
JP    03-116663 A    5/1991
(Continued)

OTHER PUBLICATIONS

Tsukahara, H., Machine translation of JP 10-079254 A, Mar. 1998.
(Continued)

*Primary Examiner* — Sean P Cullen
(74) *Attorney, Agent, or Firm* — Lee & Morse, P.C.

(57) ABSTRACT

A method of manufacturing a rechargeable battery includes continuously supplying a first electrode plate, the first electrode plate including a plurality of first active material portions with gaps therebetween on a first current collector, continuously supplying a first separator and a second separator to respective surfaces of the first electrode plate, bending the first electrode plate with the first and second separators to form a zigzag structure with bent portions, supplying a second electrode plate to an inside of each bent portion of the zigzag structure, the second electrode plate including a second active material portion on a second current collector, aligning and stacking the first electrode plate, the first separator, the second separator, and the second electrode plate, and taping the aligned and stacked first electrode plate, first separator, second separator, and second electrode plate at an outermost side thereof.

7 Claims, 8 Drawing Sheets

(51) Int. Cl.
*H01M 10/12* (2006.01)
*H01M 16/00* (2006.01)

(52) U.S. Cl.
CPC ....... *H01M 10/125* (2013.01); *H01M 16/006* (2013.01); *Y02E 60/126* (2013.01); *Y02P 70/54* (2015.11); *Y10T 29/49108* (2015.01); *Y10T 29/49112* (2015.01); *Y10T 29/49114* (2015.01)

(58) Field of Classification Search
USPC .................................................. 429/211, 246
See application file for complete search history.

(56) References Cited

U.S. PATENT DOCUMENTS

| | | |
|---|---|---|
| 6,726,733 B2 | 4/2004 | Lee et al. |
| 2002/0007552 A1 | 1/2002 | Singleton et al. |
| 2004/0161669 A1 | 8/2004 | Zolotnik et al. |
| 2005/0260490 A1 | 11/2005 | Persi et al. |
| 2006/0051652 A1 | 3/2006 | Samuels |
| 2007/0231698 A1 | 10/2007 | Kawase et al. |
| 2010/0015511 A1 | 1/2010 | Yoo et al. |
| 2010/0015529 A1 | 1/2010 | Kim et al. |
| 2010/0310924 A1* | 12/2010 | Kaneda .................. H01M 4/13 429/163 |

FOREIGN PATENT DOCUMENTS

| | | | |
|---|---|---|---|
| JP | 10-079254 A | 3/1998 | |
| JP | 2002-329530 A | 11/2002 | |
| JP | 2009-140775 A | 6/2009 | |
| KR | 10-2001-0000061 A | 1/2001 | |
| KR | 10-2001-0008512 A | 2/2001 | |
| KR | 10-2001-0019700 A | 3/2001 | |
| KR | 10-2001-0082060 A | 8/2001 | |
| KR | 10-2001-0082127 A | 8/2001 | |
| KR | 10-2007-0110563 A | 11/2007 | |
| KR | 10-2007-0116295 A | 12/2007 | |
| KR | 10-2008-0036250 A | 4/2008 | |
| KR | 10-2008-037863 A | 5/2008 | |
| WO | WO 00/77866 A1 | 12/2000 | |
| WO | WO 2007132994 A1 * | 11/2007 | ........ H01M 10/0413 |
| WO | WO 2009141958 A1 * | 11/2009 | .............. H01M 4/13 |

OTHER PUBLICATIONS

Chung, H., Machine translation of KR 10-2008-037863 A, May 2008.
Office Action from corresponding Chinese Application dated Jan. 11, 2013.
Office Action from corresponding Chinese Application dated Aug. 27, 2013.
Office Action from corresponding Chinese Application dated Feb. 26, 2014.
Korean Notice of Allowance in KR 10-2009-0105575, dated Oct. 19, 2011 (Lee).

* cited by examiner

RECHARGEABLE BATTERY HAVING ALTERNATELY STACKED ELECTRODES

CROSS REFERENCE TO RELATED APPLICATION

This is a divisional application based on pending application Ser. No. 12/805,512, filed Aug. 4, 2010, the entire contents of which is hereby incorporated by reference.

BACKGROUND

1. Field

The described technology relates generally to a rechargeable battery and a method of manufacturing the same. More particularly, the described technology relates generally to a rechargeable battery and a method of manufacturing the same that improves productivity by simplifying a manufacturing process.

2. Description of the Related Art

A rechargeable battery includes a positive electrode plate and a negative electrode plate in which an active material is coated on a current collector, a separator that separates the positive electrode plate and the negative electrode plate, an electrolyte that delivers ions through the separator, a can (or case) that houses the positive electrode plate, the separator, and the negative electrode plate, a lead tab that is connected to the positive electrode plate and the negative electrode plate to be drawn out to the outside of the can (or case), and a safety device. An electrode assembly of a rechargeable battery may include the positive and negative electrode plates with the separator therebetween, and may be classified into an electrode assembly of a winding method (jelly roll shape) and an electrode assembly of a stacking method according to a forming method of the positive electrode plate, the separator, and the negative electrode plate.

When the electrode assembly is manufactured by a winding method, as the size of the positive electrode plate, the negative electrode plate, and the separator increases, e.g., due to erroneous alignment of the electrode plates and the separator, a failure may occur. Also, when a length of the positive electrode plate and the negative electrode plate increases with a capacity increase, a manufacturing time of the electrode assembly may increase. Further, when the can of the rechargeable battery is formed in a rectangular parallelepiped shape, upon spiral-winding of the electrode plates and separator, due to a tension deviation between a bent portion and a linear portion, the active material may be peeled at the bent portions of the electrode plates and the electrode assembly may be twisted. As such, when the can is used for a long time, battery characteristics may deteriorate.

In the stacking method, an adhesive may be coated on both surfaces of the separator, and a plurality of positive electrode plates and negative electrode plates cut to a predetermined size may be alternately stacked with the separator therebetween. However, when the electrode assembly is manufactured via the stacking method, an additional process of attaching the positive electrode plates and the negative electrode plates to the separator, after previously cutting the positive electrode plates and the negative electrode plates, may be necessary, thereby increasing manufacturing time. Thus, manufacturing of the electrode assembly in a stacking method may have low productivity.

The above information disclosed in this Description of the Related Art section is only for enhancement of understanding of the background of the described technology and therefore it may contain information that does not form the prior art that is already known in this country to a person of ordinary skill in the art.

SUMMARY

Embodiments are therefore directed to a rechargeable battery and a method of manufacturing the same, which substantially overcome one or more of the problems due to the limitations and disadvantages of the related art.

It is therefore a feature of an embodiment to provide a rechargeable battery and a method of manufacturing the same having advantages of simplifying a manufacturing process and improving productivity when alternately stacking a positive electrode plate, a separator, and a negative electrode plate.

At least one of the above and other features and advantages may be realized by providing a method of manufacturing a rechargeable battery, including continuously supplying a first electrode plate, the first electrode plate including a plurality of first active material portions with gaps therebetween on a first current collector, continuously supplying a first separator and a second separator to respective surfaces of the first electrode plate, bending the first electrode plate with the first and second separators to form a zigzag structure with bent portions, supplying a second electrode plate to an inside of each bent portion of the zigzag structure, the second electrode plate including a second active material portion on a second current collector, aligning and stacking the first electrode plate, the first separator, the second separator, and the second electrode plate, and taping the aligned and stacked first electrode plate, first separator, second separator, and second electrode plate at an outermost side thereof.

The continuously supplying the first separator and the second separator may include spraying an adhesive at opposite surfaces of the first separator and the second separator that face the first electrode plate.

The continuously supplying the first separator and the second separator may further include attaching the first separator and the second separator to respective surfaces of the first electrode plate in a roll-to-roll method.

The supplying of the second electrode plate may include spraying an adhesive to outer surfaces of the first separator and the second separator that are attached to the first electrode plate.

The supplying of the second electrode plate may further include attaching the second electrode plate to each of the first separator and the second separator.

The continuously supplying of the first electrode plate may include supplying the first electrode plate having the first active material portion formed in a symmetrical structure at both surfaces of the first current collector with a gap therebetween at which the first current collector is bent.

The continuously supplying the first electrode plate may include bending the first electrode plate such that the first active material is not formed at the inside of the bent portion and the first active material is formed at the outside of the bent portion of the first current collector.

The continuously supplying of the first electrode plate may include supplying the first electrode plate with a penetration hole at the bent portions.

The aligning and stacking of the first electrode plate may include aligning the penetration holes that are formed in the bent portions at the second electrode plate.

The aligning and stacking of the first electrode plate may include aligning through a penetration hole that is formed in a tab that is connected to the first current collector and the second current collector.

The continuously supplying the first electrode plate may include integrally supplying the first electrode plate, the first separator, and the second separator by tack welding the first separator and the second separator at both surfaces of the first electrode plate that has a plurality of first active material portions that are connected to the first current collector.

The supplying of a second electrode plate may include supplying the second electrode plate by tack welding the second electrode plate to the first separator and the second separator.

The supplying of a second electrode plate may include integrally supplying the second electrode plate and the first separator and integrally supplying the second electrode plate and the second separator, by tack welding a pair of second electrode plates that are connected to the first separator and the second separator.

At least one of the above and other features and advantages may also be realized by providing a rechargeable battery, including a first electrode plate that has a first active material portion at the first current collector; a first separator and second separator that are provided at respective surfaces of the first electrode plate; and a second electrode plate that is provided at one surface of each of the first separator and the second separator and that has a second active material portion corresponding to the first active material at a second current collector, wherein the first electrode plate, the first separator, and the second separator are bent in a zigzag state to be stacked with the second electrode plate and form at least one double cell by disposing the first electrode plate at both sides of the one second electrode plate, and at the double cell, each of the first electrode plate, the first separator, and the second separator are integrally connected.

The first electrode plate may form the first active material portion in a symmetrical structure at both surfaces of the first current collector at a space between the bent portions of the first current collector.

The first electrode plate may not have the first active material at the inside of the bent portion and have the first active material at the outside of the bent portion at the bent portions of the first current collector.

The first electrode plate may have a penetration hole at the bent portions.

The first current collector and the second current collector may have a penetration hole that is formed in a tab.

The first electrode plate may form a negative electrode, and the second electrode plate may form a positive electrode.

BRIEF DESCRIPTION OF THE DRAWINGS

The above and other features and advantages will become more apparent to those of ordinary skill in the art by describing in detail exemplary embodiments with reference to the attached drawings, in which.

DESCRIPTION OF REFERENCE NUMERALS INDICATING PRIMARY ELEMENTS IN THE DRAWINGS

| | |
|---|---|
| 1, 2: electrode assembly | 10, 210: first electrode plate |
| 11: first current collector | 11a, 11b: bent portion |
| 11c: penetration hole | 12, 212: first active material portion |
| 13: tab | 14: penetration hole |
| 20, 520: second electrode plate | 21: second current collector |
| 22: second active material portion | 31, 32: first and second separators |
| 33, 34, 35, 36: dispenser | 41, 42, 43: first roll |
| 44, 45: second roll and third roll | 51: tape |
| DC: double cell | G1, G2: gap |

DETAILED DESCRIPTION

Korean Patent Application No. 10-2009-0105575, filed on Nov. 3, 2009, in the Korean Intellectual Property Office, and entitled: "Rechargeable Battery and Method of Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
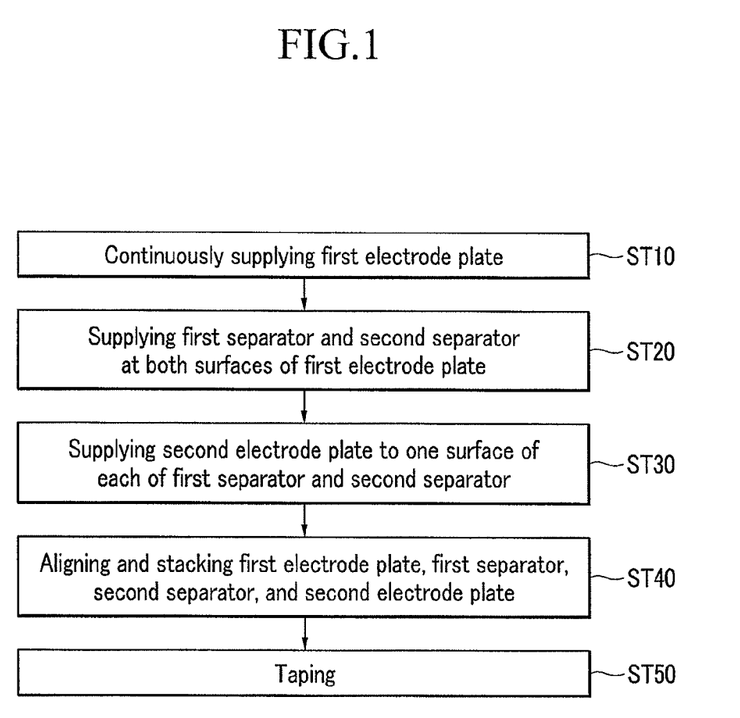
FIG. 1 illustrates a flowchart of a method of manufacturing a rechargeable battery according to an exemplary embodiment.
Figure 2:
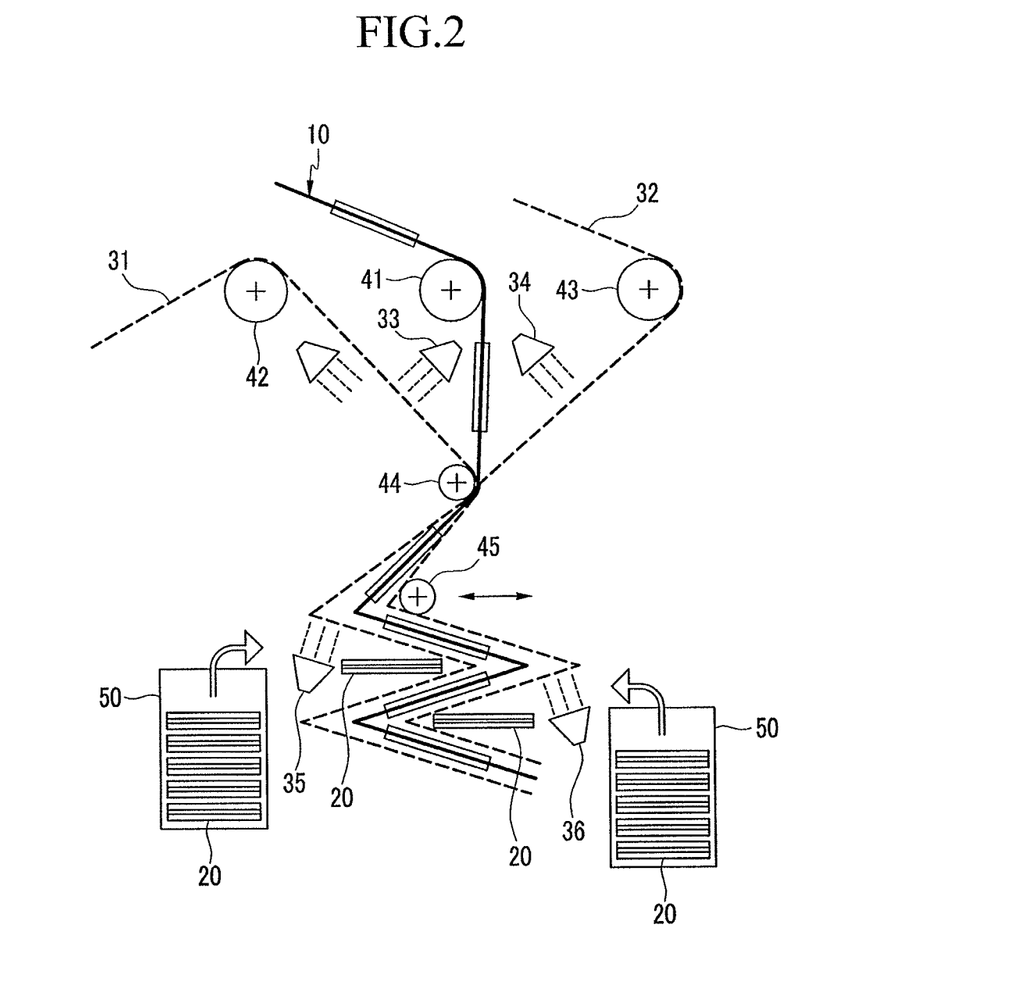
FIG. 2 illustrates a schematic diagram of a device for manufacturing a rechargeable battery according to an exemplary embodiment.

FIG. 1 illustrates a flowchart of a method of manufacturing a rechargeable battery according to an exemplary embodiment, and FIG. 2 illustrates a schematic diagram of a device for manufacturing a rechargeable battery according to an exemplary embodiment. Referring to FIGS. 1 and 2, in a method of manufacturing a rechargeable battery according to the present exemplary embodiment, an electrode assembly may be formed by a stacking method.

Referring to FIGS. 1 and 2, a method of manufacturing a rechargeable battery having a first electrode plate 10, a first separator 31, a second separator 32, and a second electrode plate 20 may include a step of supplying the first electrode plate 10 (ST10), a step of supplying the first and second separators 31 and 32 (ST20), a step of supplying the second electrode plate 20 (ST30), a step of aligning and stacking the first electrode plate 10, the first separator 31, the second separator 32, and the second electrode plate 20 (ST40), and a step of forming an electrode assembly by taping (ST50). Each of the steps ST10 to ST50 will be described hereinafter in detail.

Figure 3:
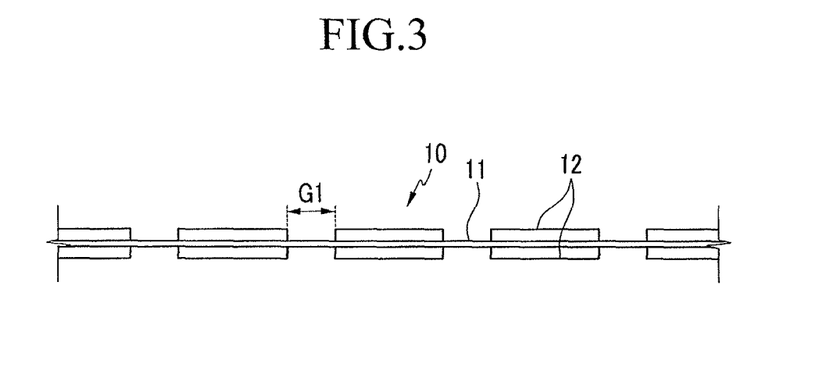
FIG. 3 illustrates a side view of a first electrode plate according to an exemplary embodiment.

FIG. 3 illustrates a side view of the first electrode plate 10 according to the first exemplary embodiment. Referring to FIG. 3, the first electrode plate 10 may include a first current collector 11 formed in a connection structure of a belt state, and a plurality of first active material portions 12. The first active material portions 12 may be formed while sustaining a gap G1 therebetween in a length direction of the first current collector 11 at both surfaces of the first current collector 11. That is, the first current collector 11 may have a continuous structure, and a plurality of the first active material portions 12 may be formed at constant intervals, i.e., gaps G1, along a longitudinal direction of the first current collector 11 on each surface of the firstcurrent collector 11. The first active material portions 12 may be symmetrically formed on both surfaces of the first current collector 11, e.g., each pair of first active material portions 12 facing each other from opposite surfaces of the first current collector 11 may completely overlap each other, so the gaps G1 on one surface (i.e., a first surface) of the first current collector 11 may be, aligned with the gaps G1 on an opposite surface (i.e., a second surface) of the first current collector 11.

The step of supplying the first electrode plate 10 (ST10) may include a continuous supply of the first electrode plate 10 illustrated in FIG. 3. In detail, as illustrated in FIG. 2, the first electrode plate 10 may be continuously supplied, e.g., without cutting portions thereof, while being bent in a zigzag manner with a roll-to-roll method. That is, the first electrode plate 10 may be formed to be bent at portions of the first current collector 11 between adjacent first active material portions 12, i.e., at the gaps G1.

The step of supplying the first and second separators 31 and 32 (ST20) may include supply of the first and second separators 31 and 32 to both respective surfaces of the first current collector 11 of the first electrode plate 10. In detail, as illustrated in FIG. 2, the first separator 31 and the second separator 32 may be bent in a zigzag state with a roll-to-roll method, and may be continuously supplied at respective sides of the first electrode plate 10.

As further illustrated in FIG. 2, the first electrode plate 10 and the first and second separators 31 and 32 may be respectively directed around first rolls 41, 42, and 43, and may be bent through common second and third rolls 44 and 45. The third roll 45 may be offset horizontally with respect to the second roll 44 in order to bend the first electrode plate 10 and the first and second separators 31 and 32. It is noted that a horizontal direction refers to a lateral direction of FIG. 2 that is substantially perpendicular to a supply direction, i.e., vertical direction of FIG. 2.

Further, the step of supplying the first and second separators 31 and 32 (ST20) may include a step of spraying a first adhesive and a first attaching step. In detail, as illustrated in FIG. 2, the step of spraying the first adhesive may include spraying an adhesive by dispensers 33 and 34 to inner surfaces of the first separator 31 and the second separator 32, i.e., surfaces facing respective opposite surfaces of the first electrode plate 10. The first attaching step may include attaching the inner surfaces of the first and second separators 31 and 32 to respective surfaces of the first electrode plate 10 in a roll-to-roll method, as illustrated in FIG. 2. The dispensers 33 and 34 may be installed between the first rolls 41, 42, and 43 and the second roll 44 to perform the step of spraying the first adhesive before the first and second separators 31 and 32 contact the first electrode plate 10 at the second roll 44. After the step of spraying the first adhesive, the first attaching step is performed when the first electrode plate 10 and the first and second separators 31 and 32 closely contact each other to pass by the second roll 44.

Figure 4:
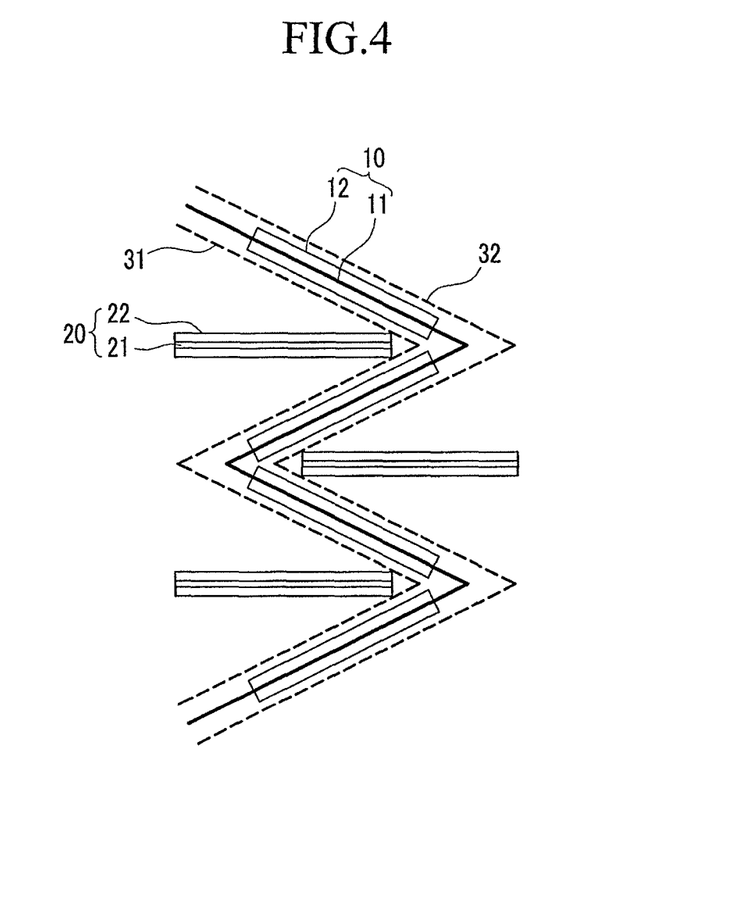
FIG. 4 illustrates a detailed, enlarged view of a portion of FIG. 2, in which a second electrode plate is supplied to the first electrode plate and the first and second separators.

FIG. 4 illustrates a detailed, enlarged view of a process in FIG. 2, in which the first electrode plate 10 and the first and second separators 31 and 32 are bent, and the second electrode plate 20 is supplied. Referring to FIGS. 2 and 4, the step of supplying the second electrode plate 20 (ST30) includes supplying the second electrode plate 20 to one surface of each of first and second separators 31 and 32. In detail, as illustrated in FIG. 4, the second electrode plate 20 may be formed as a second current collector 21 with a second active material portion 22 provided at both surfaces thereof. The second electrode plate 20 may include individual, i.e., discrete, second electrode plates 20 alternately inserted to an inside of each zigzag portion of the bent first electrode plate 10 and adjacent to the respective first and second separators 31 and 32 on the opposite side to the first active material portions 12.

That is, as illustrated in FIG. 2, the first electrode plate 10 and the first and second separators 31 and 32 may be attached by the second and third rolls 44 and 45 to be bent in a zigzag state. In other words, the first electrode plate 10 may be between the first and second separators 31 and 32, and may be bent with each of the first and second separators 31 and 32 to have sharp turns in alternating directions. As illustrated in FIGS. 2 and 4, the second electrode plates 20 may be alternately supplied at the outsides of the first and second separators 31 and 32 by supply units 50 provided at both sides of the first electrode plate 10. For example, as illustrated in FIG. 2, one individual second electrode plate 20 may be supplied by the left supply unit 50 (in FIG. 2) into, e.g., each, zigzag bend facing the left supply unit 50 to contact the first separator 31. In another example, as illustrated in FIG. 2, one individual second electrode plate 20 may be supplied by the right supply unit 50 (in FIG. 2) into, e.g., each, zigzag bend facing the right supply unit 50 to contact the second separator 32.

Therefore, the first electrode plate 10 and the first and second separators 31 and 32 may have a second electrode plate 20 at each of spaces between the first and second separators 31 and 32, and thus, the first electrode plate 10 and the second electrode plate 20 may be alternately stacked. For example, as illustrated in FIG. 4, positioning one individual second electrode plate 20 inside each zigzag bend, i.e., a bend defined by two adjacent first active material portions 12 of the first electrode plate 10, may provide an alternating arrangement of first and second electrode plates 10 and 20, i.e., one second electrode plate 20 between two first electrode plates 10.

Further, supplying the second electrode plates 20 (ST30) may include spraying a second adhesive and a second attaching step. The spraying the second adhesive may include spraying an adhesive by dispensers 35 and 36 at outer surfaces of the first and second separators 31 and 32, i.e., surfaces opposite respective inner surfaces, opposite those that are attached to the first electrode plate 10. The second attaching step may include alternately attaching the second electrode plates 20 to the first and second separators 31 and 32, i.e., to surfaces sprayed with the second adhesive. While the second electrode plates 20 are inserted and the first electrode plate 10 and the first and second separators 31 and 32 are stacked, the second electrode plates 20 may be attached to each of the first and second separators 31 and 32.

Figure 5:
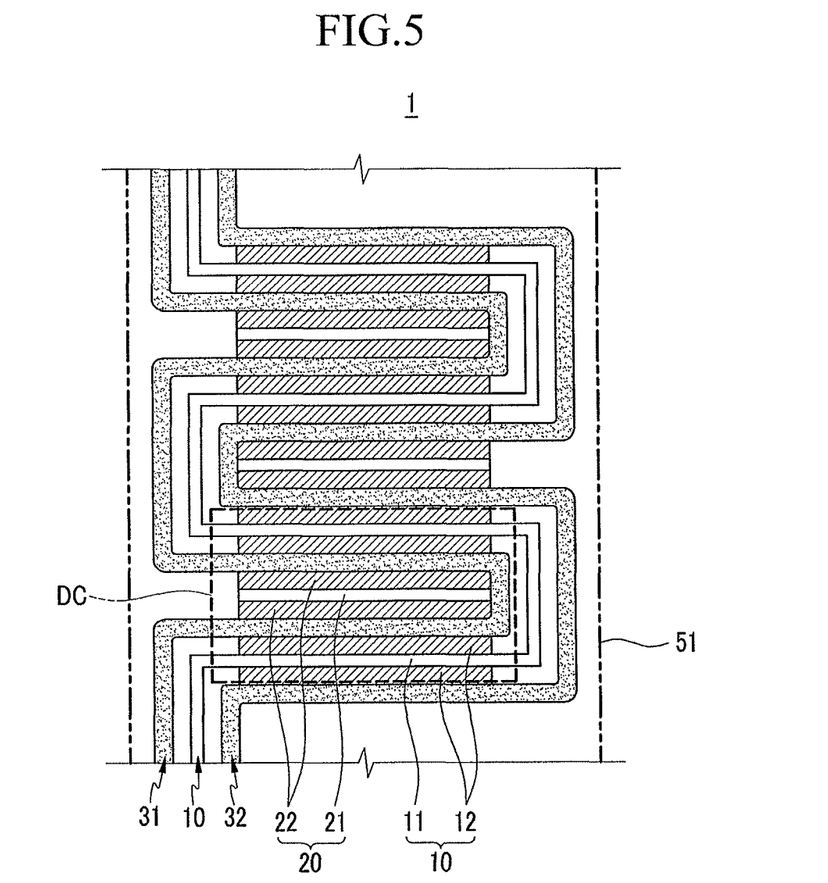
FIG. 5 illustrates a partial cross-sectional view of an electrode assembly stacked according to an exemplary embodiment.

FIG. 5 illustrates a partial cross-sectional view of an electrode assembly including a stacked structure of the first and second electrode plates 10 and 20 with the first and second separators 31 and 32 therebetween. It is noted that the structure illustrated in FIG. 5 is a state after stacking and alignment is complete, i.e., after the process of FIG. 4.

Referring to FIG. 5, in the step of aligning/stacking (ST40), the bent first electrode plate 10, first and second separators 31 and 32, and second electrode plate 20 may be aligned and stacked. The first electrode plate 10, the first and second separators 31 and 32, and the second electrode plate 20 may be aligned by adjusting tension of the supplied first electrode plate 10 and the first and second separators 31 and 32. For example, the tension of the supplied first electrode plate 10 and the first and second separators 31 and 32 may be adjusted, so opposite surfaces of each second electrode plate 20 may completely overlap and be in direct contact with respective surfaces of the first and/or second separators 31 and 32. As such, the first and second electrode plates 10 and 20 may be arranged to, e.g., completely, overlap each other, e.g., first and second active material portions 12 and 22 may completely overlap each other, so respective terminal edges of the first and second electrode plates 10 and 20 may be aligned. Alignment of the edges will be described in more detail below with reference to FIG. 10.

At the taping step (ST50), as illustrated in FIG. 5, the first electrode plate 10, the first and second separators 31 and 32, and the second electrode plate 20, in which aligning and stacking are complete, may be taped with a tape 51 at an outermost side to form an electrode assembly 1. Therefore, the first electrode plate 10, the first and second separators 31 and 32, and the second electrode plate 20 may not move or twist in the electrode assembly 1 of a stacked state.

In the electrode assembly 1, the first electrode plate 10 may be a positive electrode or a negative electrode, and in this case, the second electrode plate 20 may be a negative electrode or a positive electrode, i.e., opposite in polarity to the first electrode plate 10. Because the first electrode plate 10 is connected to the first current collector 11, when the first electrode plate 10 is a negative electrode and the second electrode plate 20 is a positive electrode, safety for a short circuit of the electrode assembly 1 may be further improved, as compared with a case where the first electrode plate forms a positive electrode and the second electrode plate forms a negative electrode.

In a full cell that forms a rechargeable battery according to the present exemplary embodiment, the first electrode plate 10 and the first and second separators 31 and 32 may be bent in a zigzag state to be stacked with the second electrode plate 20. By disposing the first electrode plate 10 at both sides of one second electrode plate 20, one or a plurality of double cells (DC) may be formed. The DC may include two unit cells.

In the DC, because the first electrode plate 10 and the first and second separators 31 and 32 are each integrally connected, when stacking the first electrode plate 10, the first and second separators 31 and 32, and the second electrode plate 20, a manufacturing process may be simplified and productivity may be improved.

Figure 6:
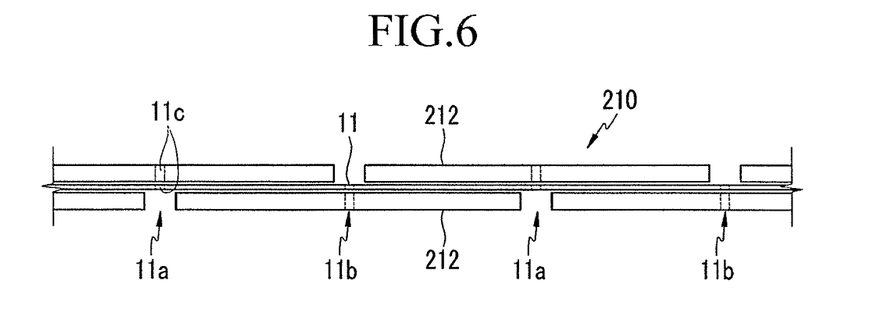
FIG. 6 illustrates a side view of a first electrode plate according to another exemplary embodiment.
Figure 7:
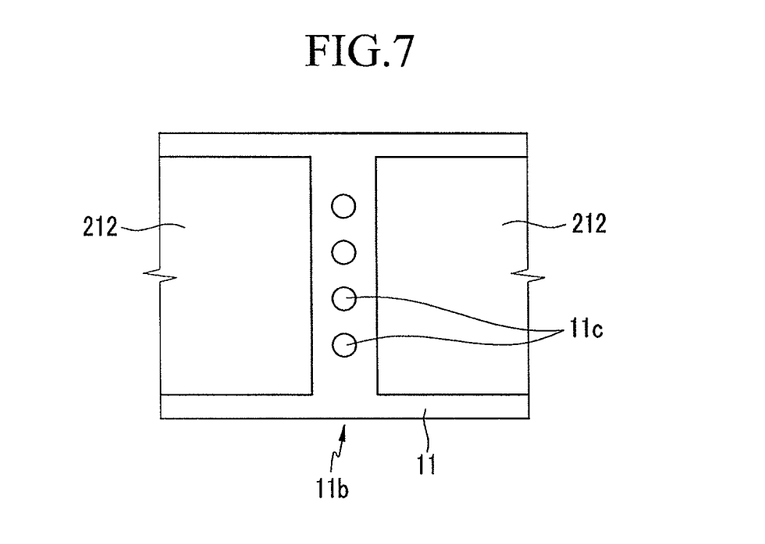
FIG. 7 illustrates a partial top plan view of the first electrode plate of FIG. 6.

FIG. 6 illustrates a side view of a first electrode plate according to a second exemplary embodiment. FIG. 7 illustrates a partial top plan view of the first electrode plate of FIG. 6.

Referring to FIG. 6, a first electrode plate 210 according to the second exemplary embodiment may include bent portions 11a and 11b at both sides of a bent first current collector 11. Therefore, at the step of supplying the first electrode plate 210, a first active material portion 212 may not be provided at the inside of the bent portions 11a and 11b, so the first active material portion 212 may not be supplied at the outside of the bent portions 11a and 11b. For example, the first electrode plate 210 may be bent at the bent portion 11b, so a portion of the first active material portion 212 adjacent one bent portion 11a may face a portion of the first active material portion 212 adjacent an adjacent bent portion 11a. As such, an inside of the bent portion 11b, i.e., a surface of the first current collector 11 opposite a surface including the bent portion 11b, may not include the first active material portion 212. Because the first active material portion 212 is not provided at the inside of the bent portions 11a and 11b, when the first current collector 11 is bent, the first active material portion 212 may not be separated from the inside of the bent portions 11a and 11b. Therefore, characteristics of the battery may be prevented from being deteriorated. As the first active material portion 212 in the first electrode plate 210 is continuously provided at the outside of the bent portions, an area of the first active material portion 212 may be larger than that of the first active material portion 12 in the first electrode plate 10 described previously with reference to FIG. 3, thereby increasing capacity of the battery.

Further, the first electrode plate 210 may include a penetration hole 11c at the bent portions 11a and 11b that are formed at both sides. Therefore, even if the first active material portion 212 is formed at the outside of the bent portions 11a and 11b, when an electrolyte is used, a flow path may be secured via the penetration hole 11c. Therefore, the electrolyte may smoothly penetrate the first and second electrode plates 210 and 20. A plurality of penetration holes 11c may be formed in a width direction of the first electrode plate 210. Therefore, according to the second exemplary embodiment, at the step of supplying the first electrode plate, the first electrode plate 210, i.e., with a previously formed penetration hole 11c, may be supplied to be bent at the bent portions 11a and 11b.

Figure 8:
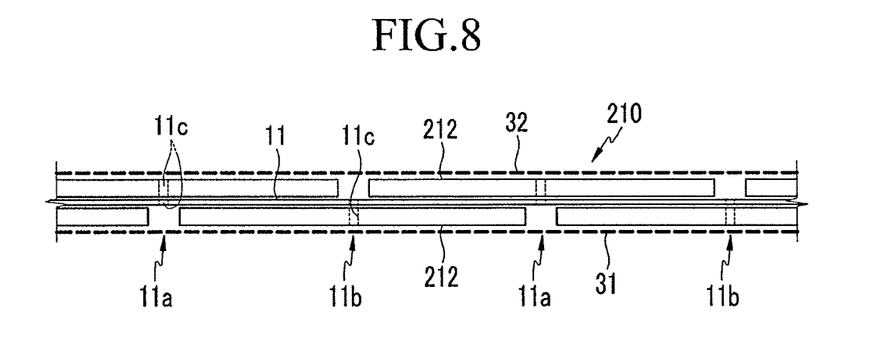
FIG. 8 illustrates a side view of an attached state of a first electrode plate and a first separator according to another exemplary embodiment.

FIG. 8 illustrates a side view of an attached state of a first electrode plate and a first separator according to a third exemplary embodiment. Referring to FIG. 8, at the step of supplying the first electrode plate, by previously tack welding the first and second separators 31 and 32 at respective surfaces of the first electrode plate 210 according to the second exemplary embodiment, the first electrode plate 210 and the first and second separators 31 and 32 may be integrally supplied. Therefore, a process of supplying the first electrode plate 210 and the first and second separators 31 and 32 may be performed more simply, e.g., simultaneously, than that of the first exemplary embodiment, i.e., described previously with reference to FIGS. 1-5.

Figure 9:
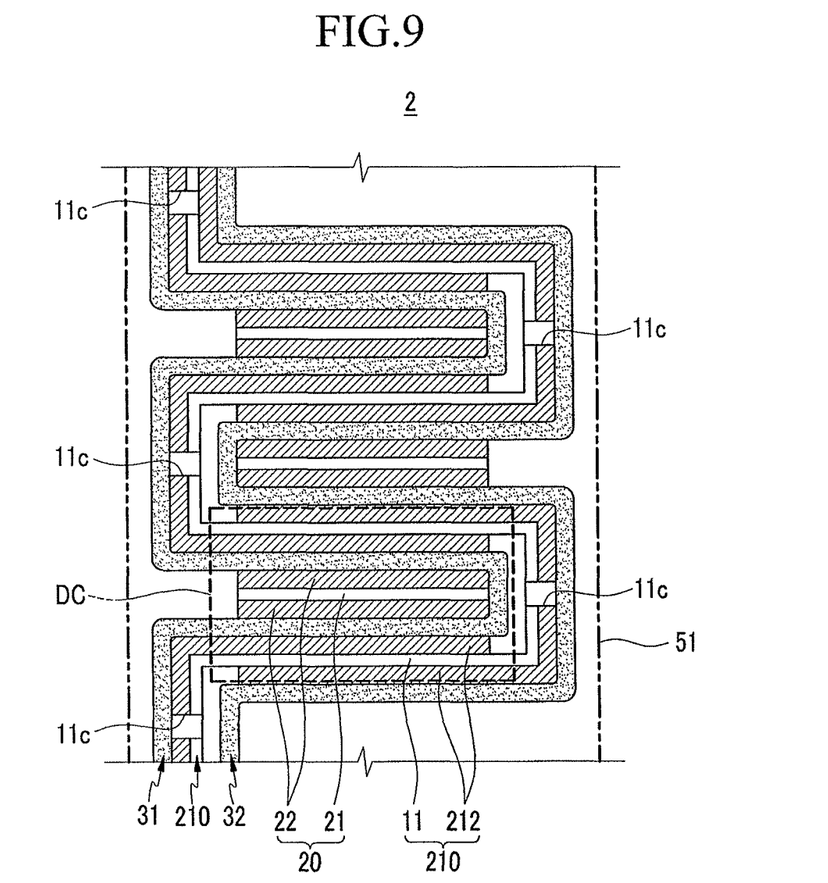
FIG. 9 illustrates a partial cross-sectional view of an electrode assembly to which the first electrode plate of FIG. 8 is applied.

FIG. 9 illustrates a partial cross-sectional view of an electrode assembly 2 including the first electrode plate of FIG. 8. Referring to FIG. 9, in the third exemplary embodiment, the step of aligning/stacking may include aligning the penetration holes 11c that are formed in the bent portions 11a and 11b with the second electrode plate 20, so a flow path of an electrolyte may be formed. At the electrode assembly 2, by forming the penetration hole 11c in the first active material portion 212 that is formed at the outside of the bent portions 11a and 11b of the first electrode plate 210, a flow path of an electrolyte to be penetrated to the second electrode plate 20 may be completed.

Figure 10:
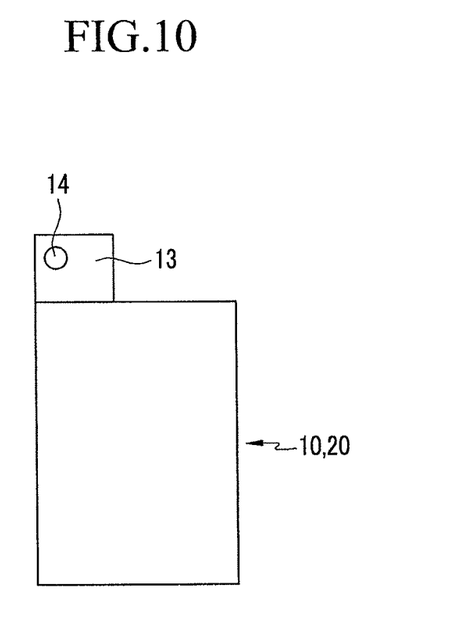
FIG. 10 illustrates a top plan view of first and second electrode plates in which an alignment hole is formed.

FIG. 10 illustrates a top plan view of the first and second electrode plates 10 and 20 in which an alignment hole is formed. Referring to FIG. 10, a penetration hole 14 may be formed in a tab 13 that is connected to the first and second current collectors 11 and 21 of the first and second electrode plates 10 and 20. At a tab notching process, the penetration hole 14 may be formed in a non-coating area that is used as the tab 13.

When a plurality of the first and second electrode plates 10 and 20 are stacked, the penetration hole 14 may allow the first and second electrode plates 10 and 20 to be easily stacked and aligned at an upper part and a lower part of a stacking direction. Further, upon stacking and aligning the first and second electrode plates 10 and 20, the first and second electrode plates 10 and 20 may be aligned based on an end surface edge thereof.

At the aligning/stacking step (ST40), the first and second electrode plates 10 and 20 may be aligned in a stacking direction through the penetration hole 14, and the first and second electrode plates 10 and 20 may be aligned through an end surface edge thereof, thereby enabling more accurate alignment. The aligned tabs 13 may be welded to a lead tab (not shown) of the rechargeable battery.

Figure 11:
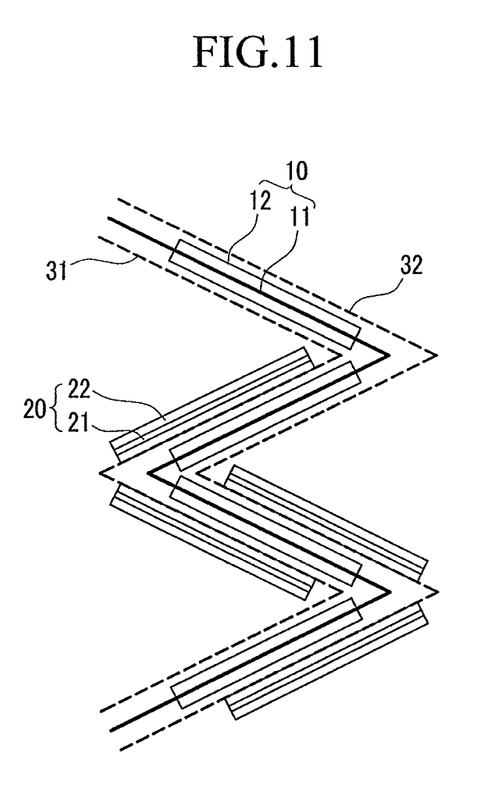
FIG. 11 illustrates a side view of a first electrode plate according to another exemplary embodiment.

FIG. 11 illustrates a side view of a first electrode plate according to a fourth exemplary embodiment. Referring to FIG. 11, the step of supplying the second electrode plate 20 may include tack welding the second electrode plate 20 to the first separator 31 and the second separator 32. Therefore, at one side of the first electrode plate 10, the second electrode plate 20 and the first separator 31 may be integrally supplied, and at the other side of the first electrode plate 10, the second electrode plate 20 and the second separator 32 may be integrally supplied. In the fourth exemplary embodiment, the first and second electrode plates 10 and 20 and the first and second separators 31 and 32 may be easily supplied, as compared with the first exemplary embodiment. Substantially, the first and second separators 31 and 32 and the second electrode plate 20 may be simultaneously supplied.

Figure 12:
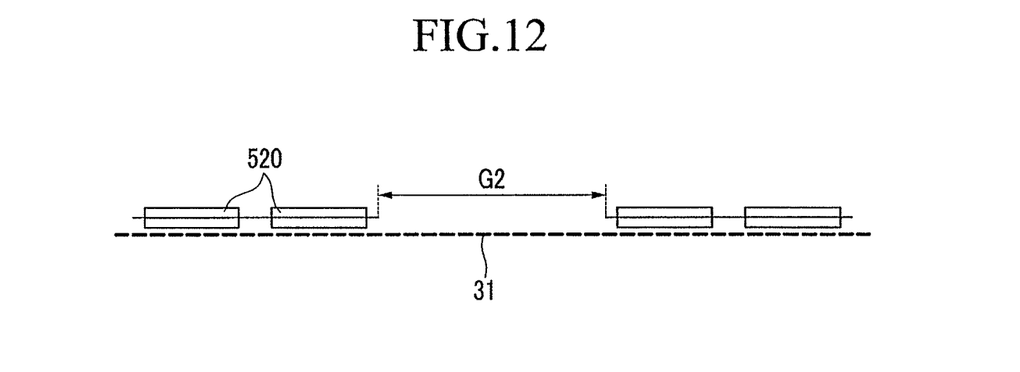
FIG. 12 illustrates a side view of an attached state of a first electrode plate and a first separator according to another exemplary embodiment.

FIG. 12 illustrates a side view of an attached state of a first electrode plate and a first separator according to a fifth exemplary embodiment. Referring to FIG. 12, in the step of supplying the second electrode plate, while sustaining a gap G2, by tack welding a pair of second electrode plates 520 that are connected to the first separator 31, the second electrode plate 520 and the first separator 31 may be integrally supplied. Further, in the step of supplying the second electrode plate, while sustaining a gap, by tack welding a pair of second electrode plates that are connected to the second separator, the second electrode plate and the second separator may be integrally supplied (not shown). In this case, in a full cell, the DCs may be connected in parallel in a stacking direction.

According to exemplary embodiments, by continuously supplying and bending the first electrode plate and the first and second separators in a zigzag state, followed by providing the second electrode plate between the first separator or the second separator, and stacking and aligning them, a unit cell and a full cell may be formed, thereby simplifying the manufacturing process, e.g., eliminating a need of separately cutting and attaching the first electrode plate. Because a full cell is formed by continuously stacking unit cells, productivity may be improved, and capacity may be changed by changing the stacking quantity of the first and second electrode plates, thereby easily adjusting the battery to a size change of a product.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
   a first electrode plate having a first current collector and a plurality of first active material portions, the plurality of first active material portions including first group material portions arranged on a first surface of the first current collector with a first gap therebetween and second group material portions arranged on a second surface of the first current collector with a second gap therebetween, the first and second surfaces of the first current collector being opposite to each other;
   a first separator and a second separator on respective surfaces of the first electrode plate; and
   a second electrode plate including a second current collector and a second active material portion on the second current collector, the second electrode plate being separated from the first electrode plate by at least one of the first separator and the second separator,
   wherein the first electrode plate, the first separator, and the second separator are bent in a zigzag structure with bent portions, the second electrode plate being arranged in an inside of each bent portion of the zigzag structure to from at least one double cell having the first electrode plate at both sides of the second electrode plate, wherein
   each of the first electrode plate, the first separator, and the second separator is integrally connected in the double cell, and wherein
   the first gap between the first group material portions and the second between the second group material portions are spaced apart from each other in a length direction of the first current collector.

2. The rechargeable battery as claimed in claim 1, wherein the first current collector and the second current collector are connected via a tab, the tab including at least one penetration hole.

3. The rechargeable battery as claimed in claim 1, wherein the first electrode plate is a negative electrode, and the second electrode plate is a positive electrode.

4. The rechargeable battery as claimed in claim 1, wherein:
   the first group material portions of the first active material portions are on a first outer surface of the bent portions of the zigzag structure, and
   the second group material portions of the first active material portions are on a second outer surface of the bent portions of the zigzag structure.

5. The rechargeable battery as claimed in claim 4, wherein the first group material portions and the second group material portions of the first active material portions are not provided on an inner surface of the bent portions.

6. The rechargeable battery as claimed in claim 4, wherein the first electrode plate has penetration holes in the bent portions.

7. The rechargeable battery as claimed in claim 6, wherein the penetration holes are in the first group material portions provided in the first outer surface of the bent portions and in the second group material portions provided in the second outer surface of the bent portions.

\* \* \* \* \*